United States Patent [19]
Marshall

[11] Patent Number: 5,868,101
[45] Date of Patent: Feb. 9, 1999

[54] ROTATING BIRD FEEDER/HOUSE

[75] Inventor: Patrick T. Marshall, Dayton, Ohio

[73] Assignee: BirdQuest Products, Inc., Beavercreek, Ohio

[21] Appl. No.: 757,798

[22] Filed: Nov. 27, 1996

[51] Int. Cl.⁶ .......................... A01K 31/00; A01K 39/01
[52] U.S. Cl. ........................................ 119/428; 119/429
[58] Field of Search .................................. 119/428, 429, 119/433, 435, 459, 14.04

[56] References Cited

U.S. PATENT DOCUMENTS

| | | | |
|---|---|---|---|
| 3,182,635 | 5/1965 | Waite | 119/57.8 X |
| 3,590,780 | 7/1971 | Dunbar | 119/57.9 |
| 3,678,901 | 7/1972 | Dulle | 119/26 |
| 3,948,220 | 4/1976 | Fiedler | 119/57.8 X |
| 4,462,337 | 7/1984 | Kilham | 119/51 |
| 5,165,364 | 11/1992 | Horkey | 119/57.8 |
| 5,269,259 | 12/1993 | Keeler | 119/72 |

Primary Examiner—Robert P. Swiatek
Assistant Examiner—Yvonne R. Abbott
Attorney, Agent, or Firm—Donald P. Gillette

[57] ABSTRACT

The present invention relates to avian enclosures which are rotated. The invention is presented as a separate electrical device that rotates birdhouses and/or birdfeeders or it can also be made part of the whole enclosure. The electromechnical device that rotates the avian enclosures basically consists of a power source, a motor, and a gearbox. Power is supplied from batteries, and/or solar cells, or an alternating current source. A more complex version of the present invention is also presented that incorporates an electronic circuit to sense the presence of birds and activate the motor only for a predetermined period of time. Consequently, the main purpose of this circuit is to conserve power which is very important for non-rechargeable batteries.

20 Claims, 11 Drawing Sheets

ROTATING BIRD FEEDER/HOUSE

BACKGROUND OF INVENTION

1. Field of the Invention

The present invention generally relates to avian enclosures. More specifically, the invention is directed at an externally separate device that rotates avian enclosures or a device that is part of the whole rotating avian enclosure.

2. Description of Prior Art

One of main purposes of avian enclosures for their owners is the enjoyment of watching birds. Unfortunately, backyard birdwatchers cannot see all sides of their birdfeeders and birdhouses. Some birds may be hidden or blocked from the birdwatcher's viewing area. As a result, some very interesting birdwatching activities are being necessarily missed-out on. However, if birdfeeders and birdhouses could be artificially rotated about their centers, there would be no more hidden viewing areas.

DRAWING FIGURES

DETAILED DESCRIPTION OF THE PREFERRED EMBODIMENTS

Figure 1:
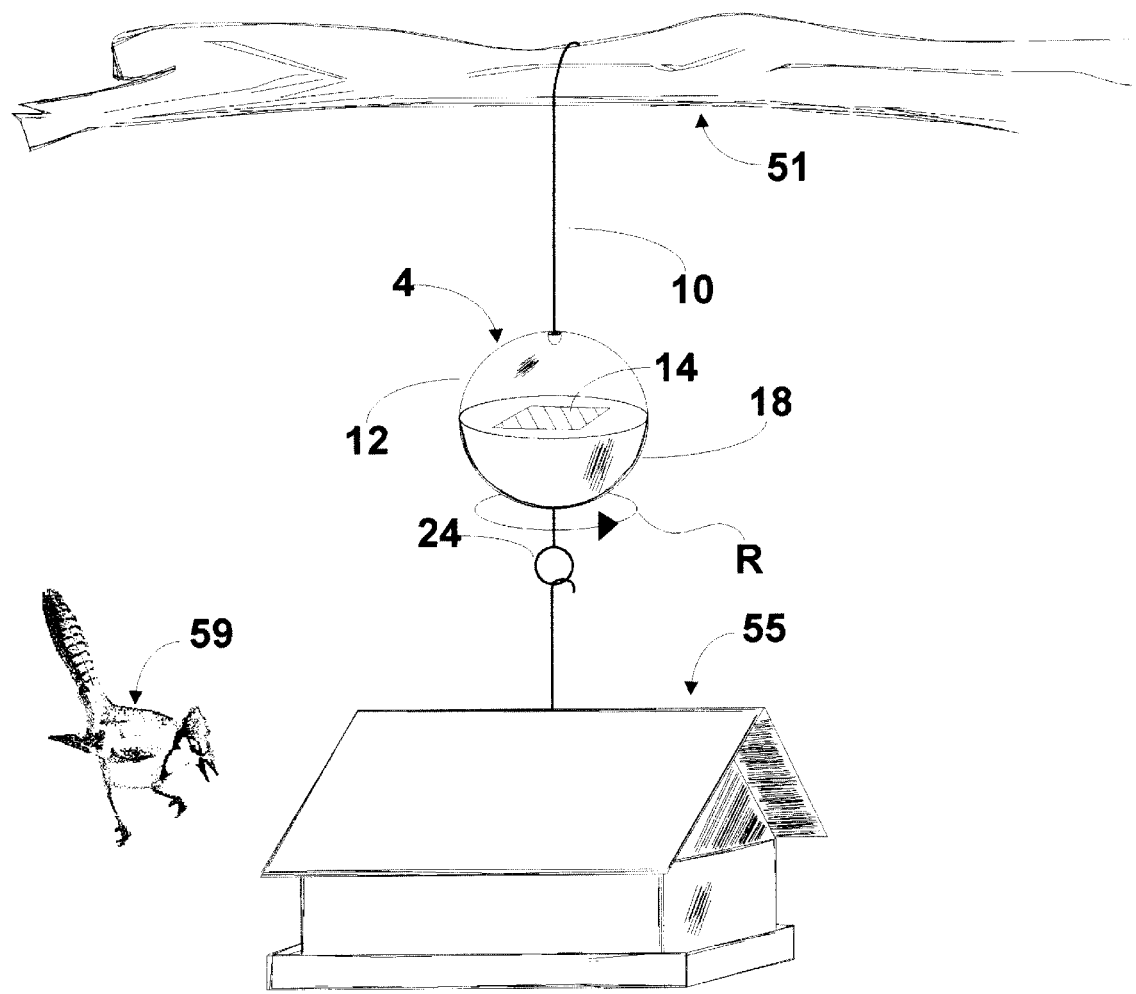
FIG. 1 is a perspective view of an external device for rotating bird feeders/houses according to the first embodiment of the invention.
Figure 2:
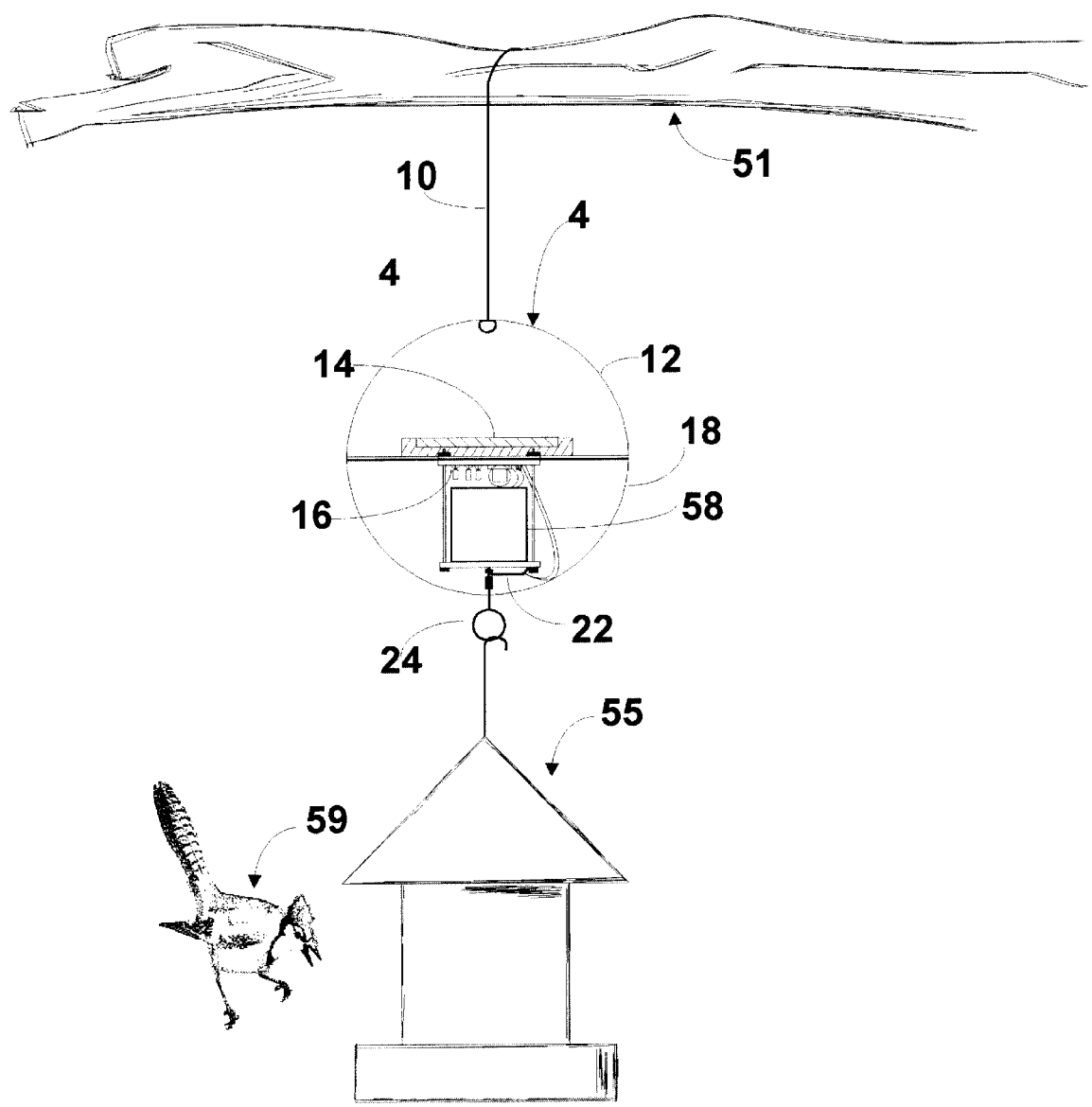
FIG. 2 is a cross-sectional view of FIG. 1 according to the first embodiment of the invention.
Figure 3:
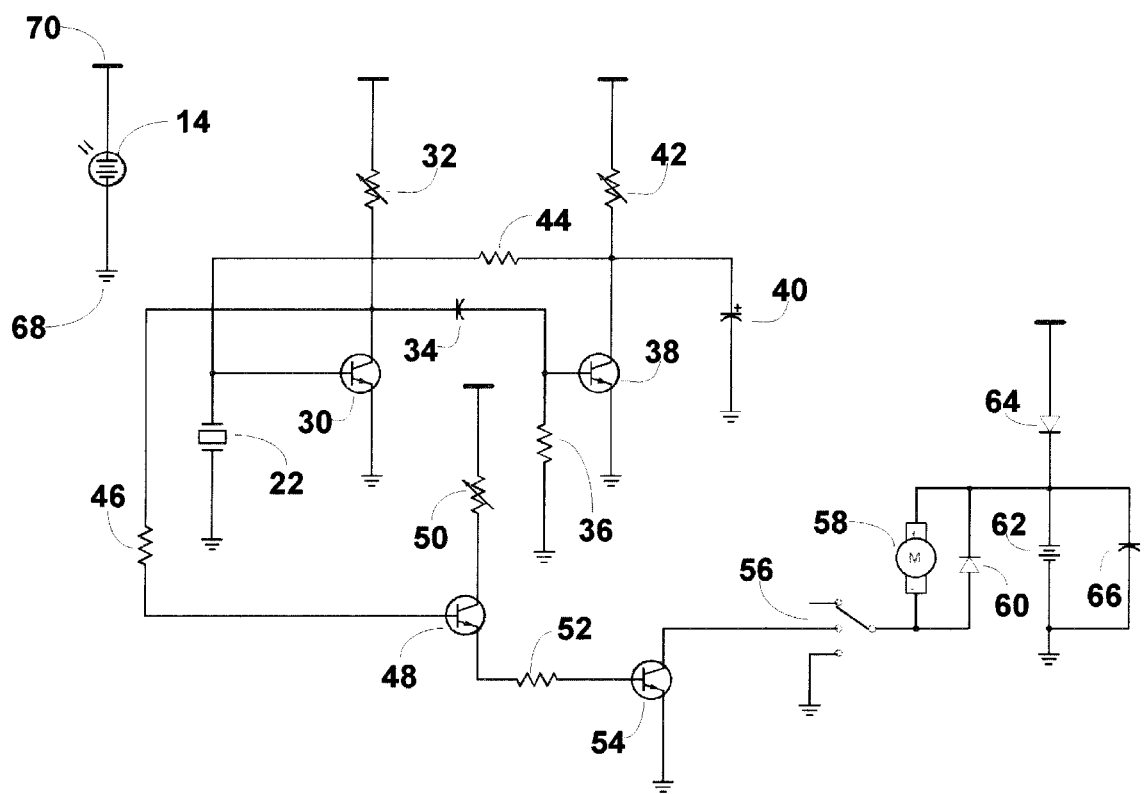
FIG. 3 is a schematic diagram of the electronic circuit according to the first embodiment of the invention.

Refer to FIGS. 1, 2, and 3 where the first embodiment the invention is presented. As can be seen in FIGS. 1 and 2, an externally separate rotating device 4 turns a bird feeder/house 55 in a circular direction indicated by arrow R. The external rotating devices 4 is hung, using a metal hanger 10, by a suitable support such as a tree limb 51 or the like. When a bird 59 lands or moves about on the bird feeder/house 55, the generated forces will produce a mechanical (vibration) -to-electrical (voltage) conversion of energy by a piezoelectric sensor 22. This sensor 22 should be located near a motor and gearbox 58 as shown in FIG. 2.

The negative-going excitation voltage of sensor 22, in FIG. 3, will deactivate an NPN transistor 30 which is normally conducting due to a biasing resistor 44. The sensitivity of transistor 30 to signals generated by sensor 22 is controlled by an variable resistor 32. The larger variable resistor 32 is, the less sensitive transistor 30 will be to the excitation voltage from sensor 22.

A capacitor 34 in FIG. 3 will then couple the positive voltage pulse at the collector of transistor 30 to the base of an NPN transistor 38. When not conducting, a resistor 36 keeps the base of transistor 38 at about ground potential. It is also used as a discharge path for capacitor 34.

This action will cause a timing capacitor 40 to discharge through NPN transistor 38 which is activated by the positive voltage potential at its base. The discharge time of capacitor 40 is almost instantaneous, but its charge time is controlled by a variable resistor 42. The larger variable resistor 42 is, the longer the charge time will be. The RC-time-constant of variable resistor 42 and capacitor 40 controls how long motor and gearbox 58 will be active. This insures that bird feeder/house 55 is rotated for an extended period of time (between 1 and 3 minutes).

The small voltage potential at the collector of transistor 38 is coupled to the base of transistor 30 through resistor 44. This action will force transistor 30 to deactivate, leaving its collector at a positive voltage potential. The positive voltage signal at the collector of transistor 30 is coupled to the base of an NPN transistor 48 though a current-limiting resistor 46. As a result, transistor 48, configured as a normally not-conducting emitter follower, will now be activated.

The positive voltage potential generated at the emitter of transistor 48 is coupled to the base of an NPN transistor 54 through a current-limiting resistor 52. This positive voltage will subsequently activate transistor 54 and, assuming an SP3T switch 56 is in its middle position, current will now flow from a rechargeable batteries 62 to motor and gearbox 58. The output shaft (not shown) of motor and gearbox 58 is connected directly to a metal ring 24 as shown in FIGS. 1 and 2. This ring 24 will, as a result of the motor's activation, start to rotate the attached bird feeder/house 55 in a manner indicated by circular arrow R shown in FIG. 1.

The current through transistor 48 is controlled by a variable resistor 50 as shown in FIG. 3. The larger variable resistor 50 is, the less current will flow through transistor 48 to the base of transistor 54. Consequently, the speed of motor and gearbox 58 is controlled by variable resistor 50. This is important because rotational speeds have to be kept very low (less than 6 RPM) in order to not scare-off or harm birds 59. However the RPM's should not be so low as to become almost boring to watch. Experimentation has determined that about 3 RPM is a safe and yet interesting rotational speed. To accomplish this, motor and speed-reduction gearbox 58 in FIG. 2 should designed to operate at about 6 RPM when variable resistor 50 is shorted. Then the bird watcher can make fine adjustments to the speed (less than 6 RPM) of motor and speed-reduction gearbox 58 using variable resistor 50.

Motor and gearbox 58 consists of a DC motor (not shown) in FIG. 2 with a large speed-reduction gearbox attached to its shaft (not shown). An added benefit of angular speed reduction device 58 is increased torque. Consequently, normal bird feeders/houses (including any squirrels, birds, and possibly bird-seed) will not be a problem to rotate.

The three positions and resulting functions of switch 56 shown in FIG. 3 are:

1.) Top position, in which motor and gearbox 58 can never be activated. This will allow rechargeable batteries 62 to be charged undisturbed which is handy for renewing a pair of batteries 62 that are completely discharged. This position will also be the default setting from the factory so shipping-type-vibrations will not activate the circuit shown in FIG. 3.

2.) Middle position, which is the normal operating position of the just described circuit shown in FIG. 3.

3). Bottom position, in which motor and gearbox 58 is always on. This is handy if the operator wants to rotate bird house/feeder 55 to a certain position. Also this could be used to periodically discharge rechargeable batteries 62, such as NiCads, to extend their operational lifetime.

A diode 60 shown in FIG. 3 is protection for back EMFs that could be generated by the motor located inside motor and gearbox 58 (not shown) in FIG. 2. In addition, a capacitor 66 shown in FIG. 3, filters out unwanted noisy electrical signals generated by motor and gearbox 58. Moreover, all ground voltage potentials (i.e., 0 volts) are denoted by a ground nodes 68.

A diode 64 prevents a solar cells 14 from discharging batteries 62 during dark hours (i.e., little or no sun light). If the voltage of light-energized power source 14 minus the voltage-drop of diode 64 is less than that of rechargeable batteries 62, then rectifier 64 will be back-biased. Therefore essentially no current may be drained from rechargeable batteries 62 to solar cells 14. Otherwise, during normal sunlight levels, the voltage-drop of diode 64 is overcome and current will be allowed to trickle-charge batteries 62.

Assuming that switch 56 is in its middle position (i.e., normal operating position), the other function of solar cells 14 is to power the rest of the circuit shown in FIG. 3 though voltage nodes 70. However during low-light level conditions (e.g., night time, cloudy or rainy days, etc.) this circuit will not be powered. This action will prevent unwanted false alarms from activating motor and gearbox 58 during times when its owner cannot enjoy watching the rotation of bird feeder/house 55. Hence, rechargeable batteries 62 are preserved for operation only during normal daylight hours.

To allow sunlight to reach solar cells 14, a clear plastic half-spherical dome 12 is used as the top half of externally separate rotating device 4. The plastic should be strong and very durable to impacts from falling objects such as tree limbs. One possible material could be a clear, polycarbanate-type plastic which also has excellent clarity.

To hide the electronics, batteries, wires, etc., an opaque plastic, half-spherical dome 18 is used as the bottom half of the externally separate rotating device 4. A suitable plastic could be ABS or Stryrene. Most of the electronic parts shown in FIG. 3 are located on a printed circuit board 16 shown in FIG. 2. Since the output voltage of solar cells 14 varies, depending upon the ambient light level, the electronic parts shown in FIG. 3 were specifically selected, configured, and designed to work over a wide range of voltages.

Figure 4:
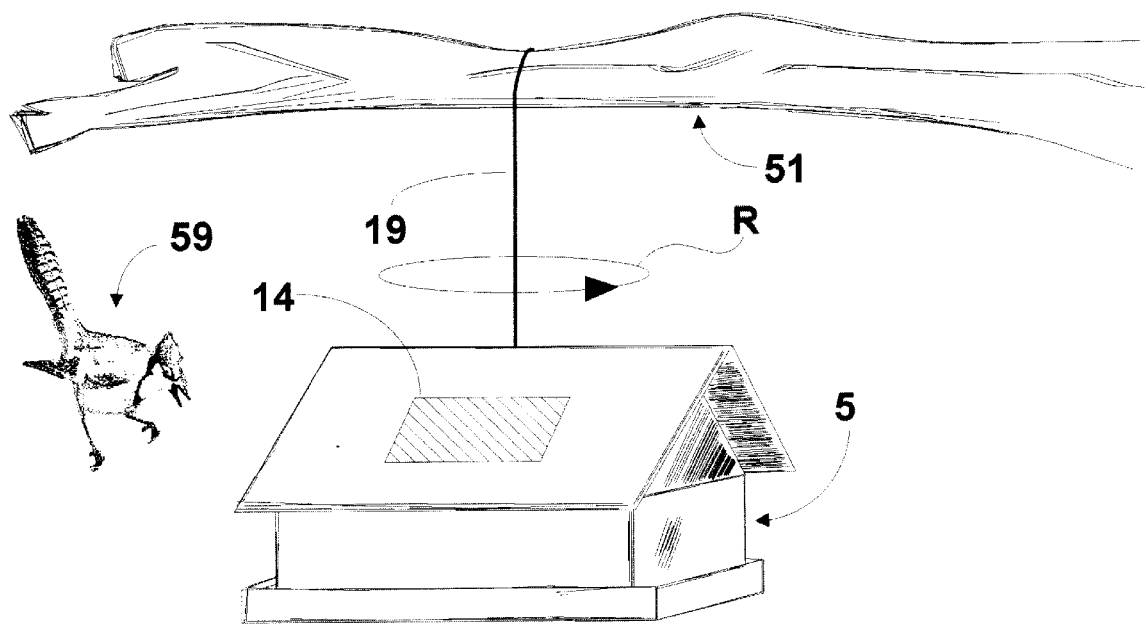
FIG. 4 is a perspective view of a rotating bird feeder/house according to the second embodiment of the invention.

Refer to FIGS. 3 and 4 where a second embodiment of the invention is presented. When bird 59 lands or moves on a rotating bird feeder/house 5 shown in FIG. 4, the vibrational energy generated will activate the circuit shown in FIG. 3. This circuit is located inside the top part (not shown) of rotating birdfeeder/house 5 in FIG. 4 just under the roof. However motor and gearbox 58 is now mounted (not shown) upside down in the upper part (loft) of rotating bird feeder/house 5 under the roof. Motor and gearbox 58 is now connected directly to a metal hanger 19. As a result, the activation of the circuit in FIG. 3 will turn the rotating bird feeder/house 5 in a circular direction indicated by arrow R shown in FIG. 4. Solar cells 14 are located on each roof of rotating bird feeder/house 5.

Figures 5, 5A:
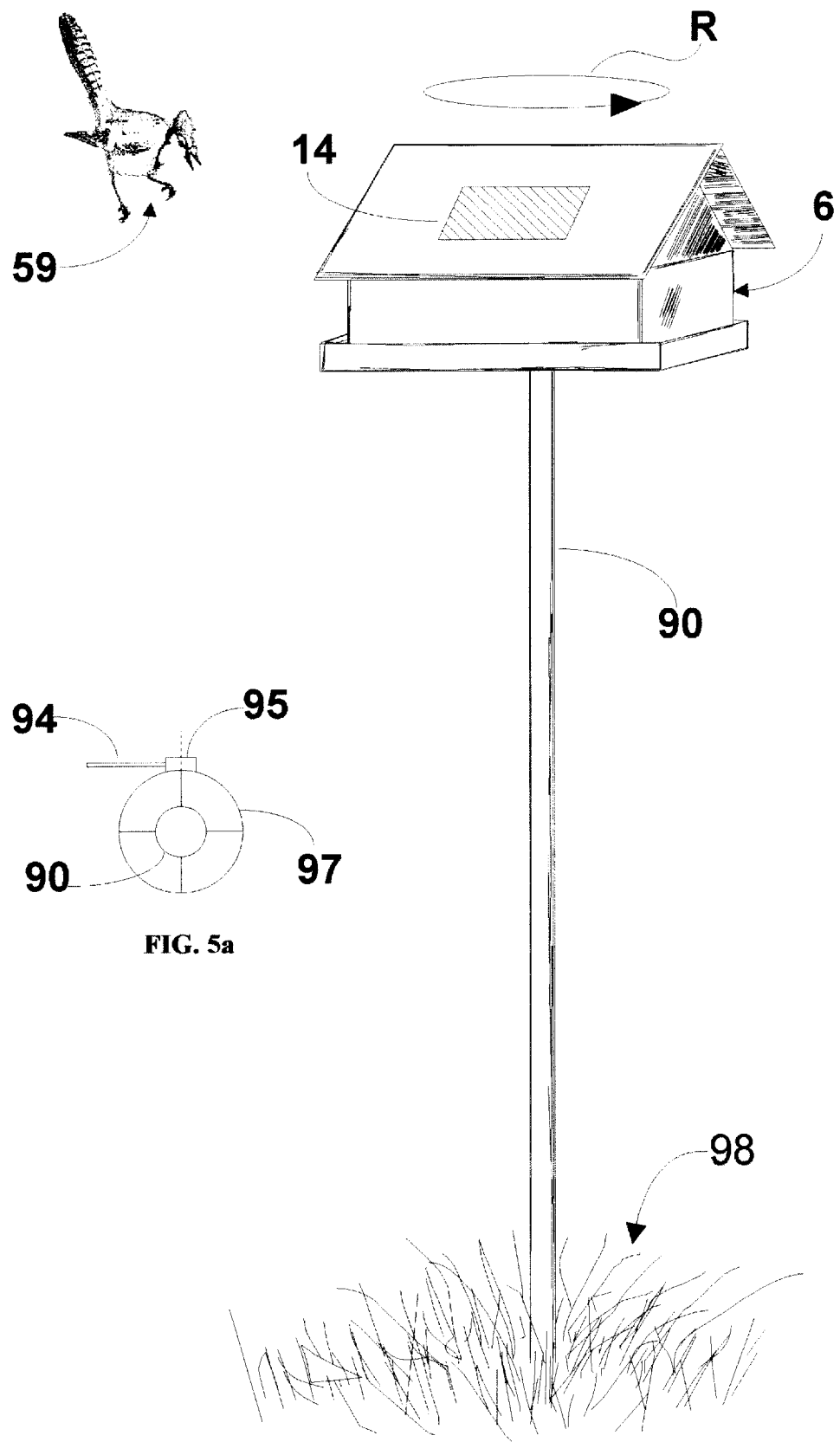
FIG. 5 is a perspective view of a rotating bird feeder/house according to the third embodiment of the invention.
FIG. 5a is a cross-sectional view of gears required for the third embodiment of the invention.

Refer to FIGS. 3, 5 and 5a where a third embodiment of the invention is presented. As can be seen in FIG. 5, a rotating bird feeder/house 6 rests on a platform (not shown) that is mounted, using ball-bearings (not shown) in FIG. 5, on a metal pole 90. To support the weight of rotating bird feeder/house 6, the metal pole 90 is driven securely into the earth 98. When bird 59 lands or moves about on rotating bird feeder/house 6, the vibration energy generated will activate the circuit shown in FIG. 3. The circuit is located inside the top part (loft) of rotating bird feeder/house 6 under the roof (not shown) in FIG. 5. A worm gear 95 shown in FIG. 5a is mounted on a shaft 94 of motor and gearbox 58. This will, upon activation of the electric motor, start to rotate around spur gear 97 which is press-fitted onto pole 90. The ball-bearings (not shown) allow rotating bird feeder/house 6 to spin about pole 90 in a circular direction indicated by arrow R in FIG. 5. As a result, rotating bird feeder/house 6 will start to rotate around pole 90. Solar cells 14 shown in FIG. 3 are located on each roof of rotating bird feeder/house 6 in FIG. 5.

Figure 6:
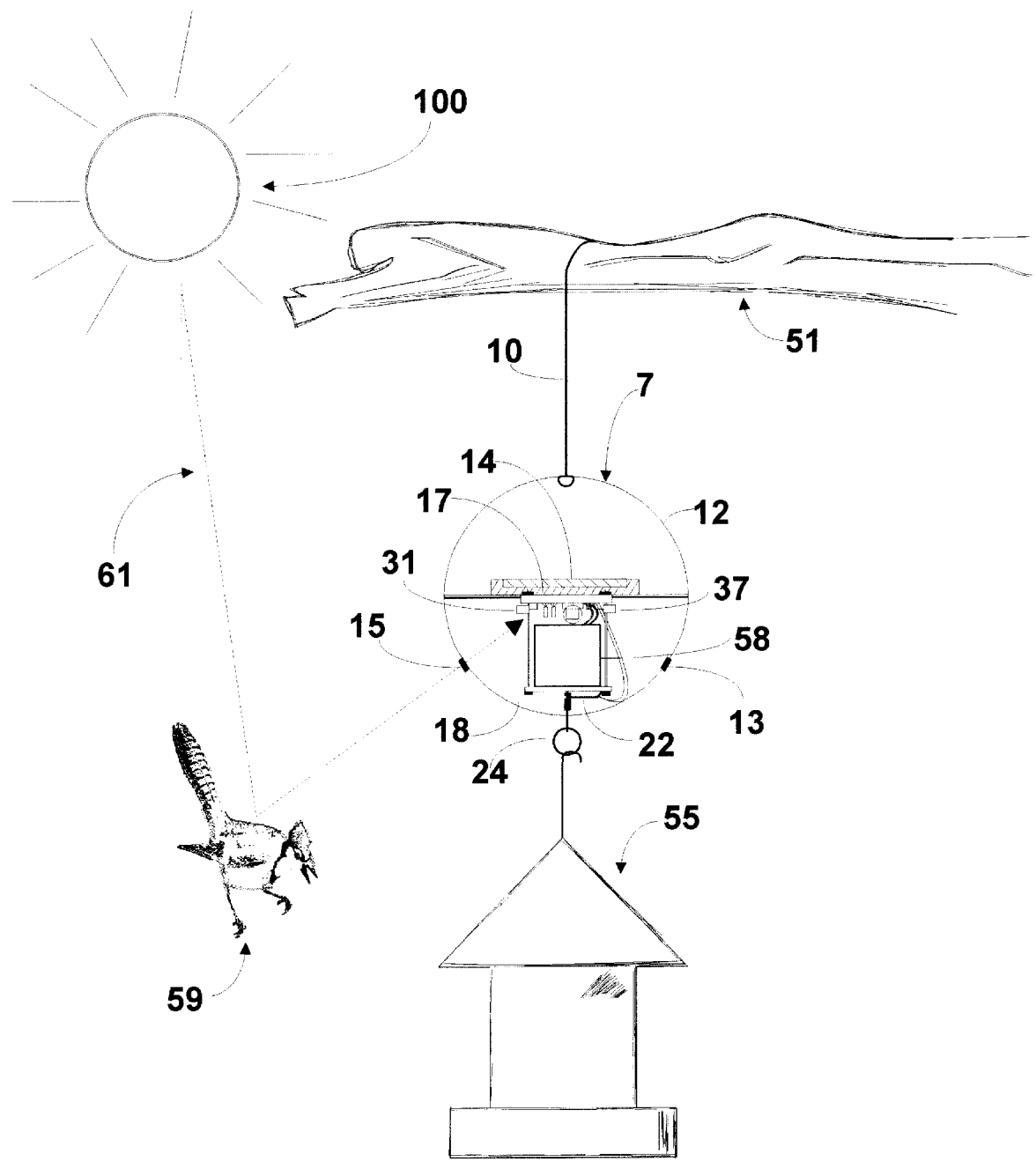
FIG. 6 is a cross-sectional view of FIG. 1 modified according to the fourth embodiment of the invention.
Figure 7:
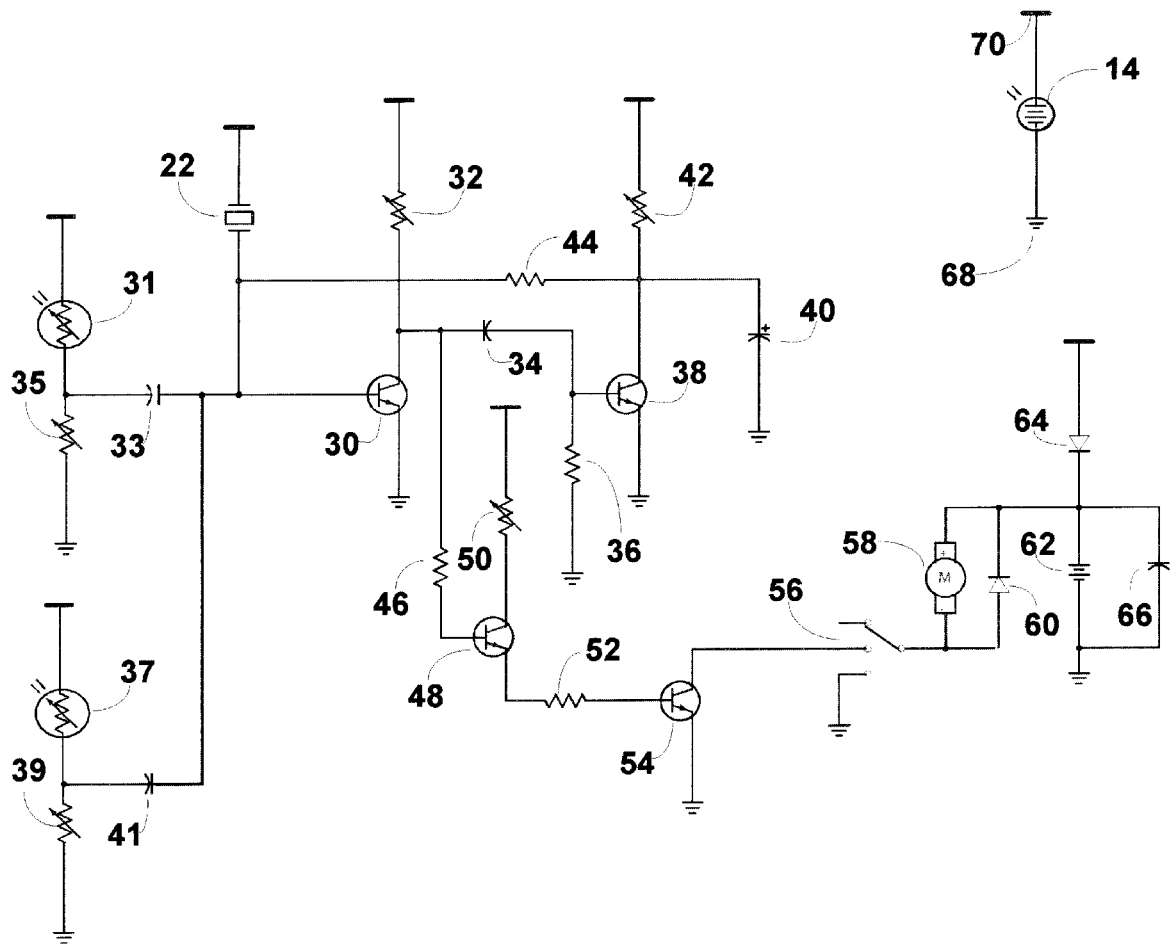
FIG. 7 is a schematic diagram of the electronic circuit according to the fourth embodiment of the invention.

Refer to FIGS. 6 and 7 where a fourth embodiment of the invention is presented. FIG. 6 depicts an externally separate device 7 for rotating bird feeders/houses 55. The bird feeder/house rotating device 7 is hung, using metal hanger 10, by a suitable support such as tree limb 51 or the like. When bird 59 approaches bird feeder/house 55, light rays 61 from the sun 100 will be deflected though a clear plastic windows 15 (and/or 13) into photoresistors 31 (and/or 37) located on a multi-sensor fusion circuit board 17 in FIG. 6. The sensitivity of photoresistors 31 and 37 is controlled by variable resistors 35 and 39, respectively, which are shown in FIG. 7. The larger the resistance of resistors 35 and 39, the less sensitive photoresistors 31 and 37 will be to changes in ambient light levels.

Another possible scenario (not shown) in FIG. 6 would involve reflected light from nearby surroundings (e.g., ground, trees, etc.). When bird 59 approaches bird feeder/house 55, reflected light from these surroundings (not shown) would be blocked temporarily from the plastic window 15 and/or window 13 and subsequently photoresistor 31 and/or photoresistor 37.

Both scenarios would cause the voltage drop across photoresistor 31 and/or photoresistor 37 in FIG. 7 to change. This changing voltage signal would be transmitted through a coupling capacitor 33 and/or a capacitor 41 respectively to the base of transistor 30. The negativegoing voltage signal would cause transistor 30, which is normally conducting, to turn off due to a biasing resistor 44.

The operation of the circuit components shown in FIG. 7 as having the same reference numerals as those in the circuit in FIG. 3 is identical to the previous discussion of the circuit shown in FIG. 3. The end result would be a rotating metal ring 24, shown in FIG. 6, that would, in turn, rotate the suspended birdfeeder/birdhouse 155.

However, the circuit shown in FIG. 7 is different from the circuit shown in FIG. 3. FIG. 7 is a multi-sensor fusion electronic circuit. In other words, it incorporates more than one sensor to detect the presence of bird(s) 59 in order to rotate bird feeder/house 55. As a result, transistor 30 now receives input signals from up to three sensors (including one from the original piezoelectric sensor 22) which is similar to a logical three-input NAND-gate whose output goes HIGH when any of its inputs goes LOW.

Most of the electronic parts shown in FIG. 7 are located on printed circuit board 17 shown in FIG. 6. Since the output voltage of solar cells 14 varies depending upon the ambient light level, the electronic parts shown in FIG. 7 were specifically selected, configured, and designed to work over a wide range of voltages. All electronics, motor and gearbox 58, wires, etc. are housed inside opaque dome 18. In addition, sunlight reaches solar cells 14 through clear plastic half-spherical dome 12 which is used as the top half of external birdfeeder/birdhouse rotating device 7.

Figure 8:
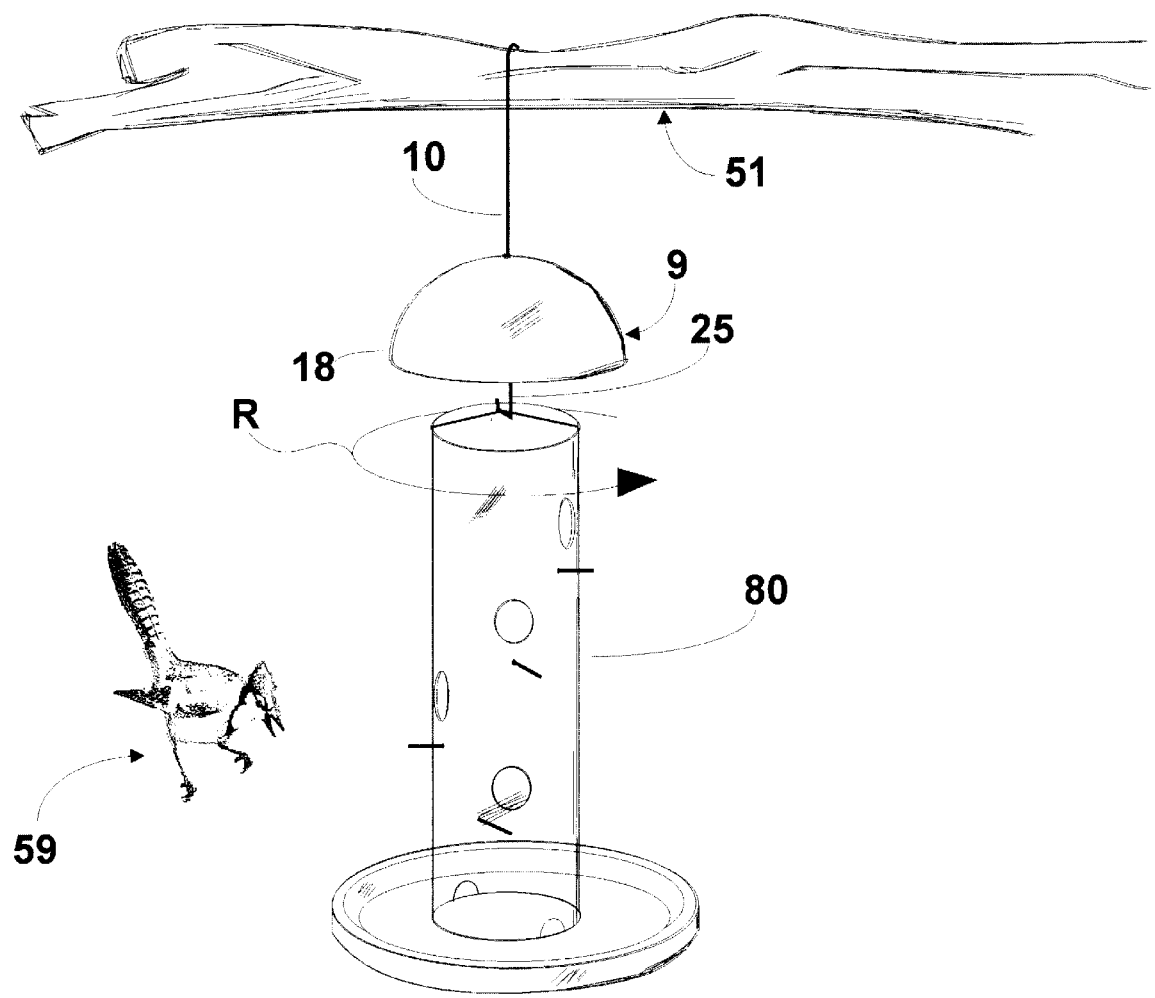
FIG. 8 is a perspective view of a rotating bird feeder/house according to the fifth embodiment of the invention.
Figure 9:
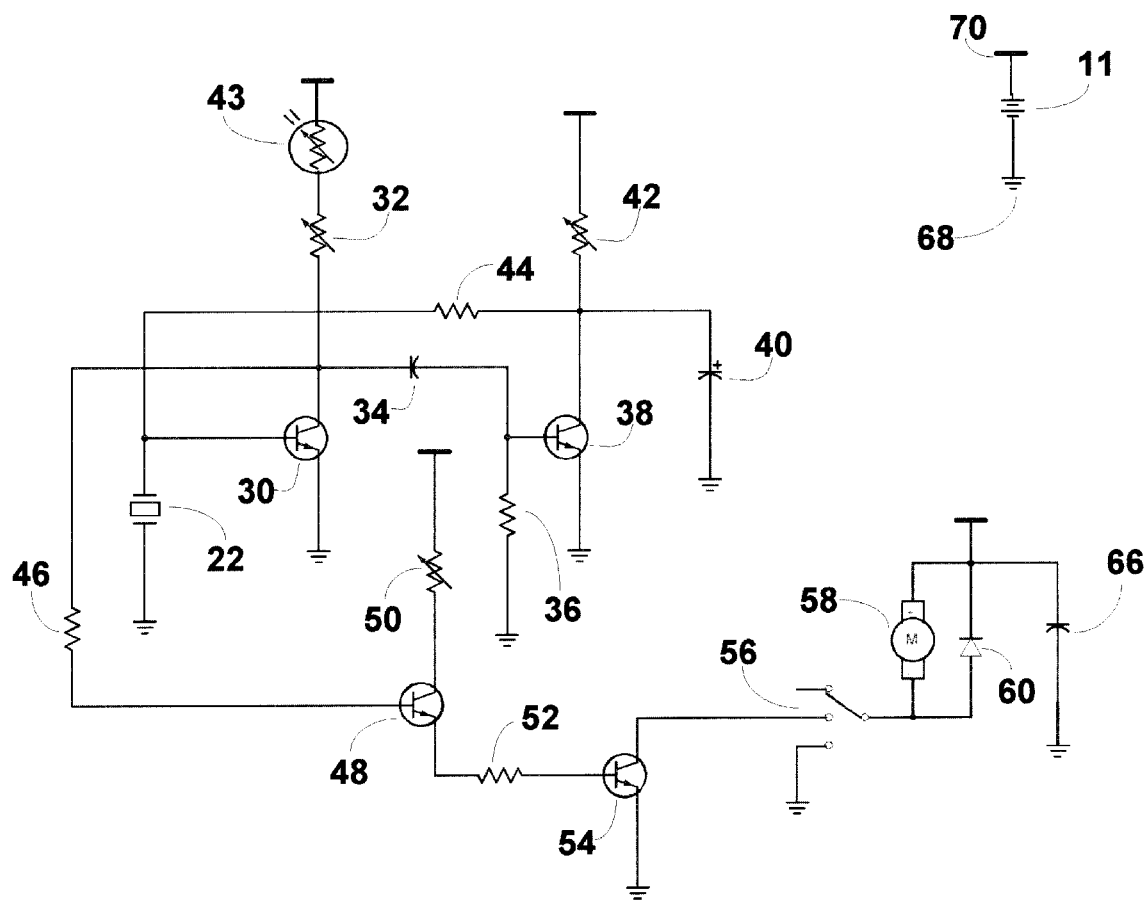
FIG. 9 is a schematic diagram of the electronic circuit according to the fifth embodiment of the invention.

Refer to FIGS. 8 and 9 where the fifth embodiment of the invention is presented. For illustrative purposes only, FIG. 8 shows only a bird feeder 80. However, the following embodiment also applies to birdhouses. The present invention is an rotating birdfeeder 9 that rotates a seed reservoir 80 in a circular direction indicated by arrow R as shown in FIG. 8. However, this embodiment now operates only on non-rechargeable batteries 11, as shown in FIG. 9. Some possible choices for batteries include alkaline or lead-acid. Other differences between the circuit shown in FIG. 9 and circuit in FIG. 3 include: (1) no solar cells and (2) a photoresistor 43 is now used in series with variable resistor 32. Otherwise the description of and operation of the circuit in FIG. 9 is identical to the previous discussion of circuit shown in FIG. 3.

The purpose of photoresistor 43 is to deactivate the circuit in FIG. 9 during low-light level conditions such as nighttime. During these times the photoresistor will have a larger voltage drop across it. This will essentially put the collector of transistor 30 at a lower voltage potential with respect to its base, which will deactivate transistor 30. The purpose of this is to prevent unwanted false alarms from activating motor and gearbox 58 during times when its owner cannot enjoy watching the rotation of seed reservoir 80. Thus batteries 11 are preserved for operation only during normal daylight hours.

Since there are no solar cells, diode 64 of FIG. 3 is no longer required. In addition, the positive terminal of batteries 11 is now, as can be seen in FIG. 9, connected directly to every positive voltage node 70. Moreover, a hook 25 shown in FIG. 8 is used in place of ring 24 of FIG. 1. This change allows the suspended birdfeeder 80 to be detached from the main unit 9, which is necessary for bird seed refills.

Note that since batteries 11 decrease their output voltage over time, the electronic components shown in FIG. 9 were specifically selected, configured, and designed to work over a wide range of voltages. As a result, depending on usage, this circuit will operate for an extended period of time. As before, all electronics, motor and gearbox 58, wires, etc. are housed inside opaque dome 18 shown in FIG. 8 which is now the top half of external birdfeeder rotating device 9.

Figure 10:
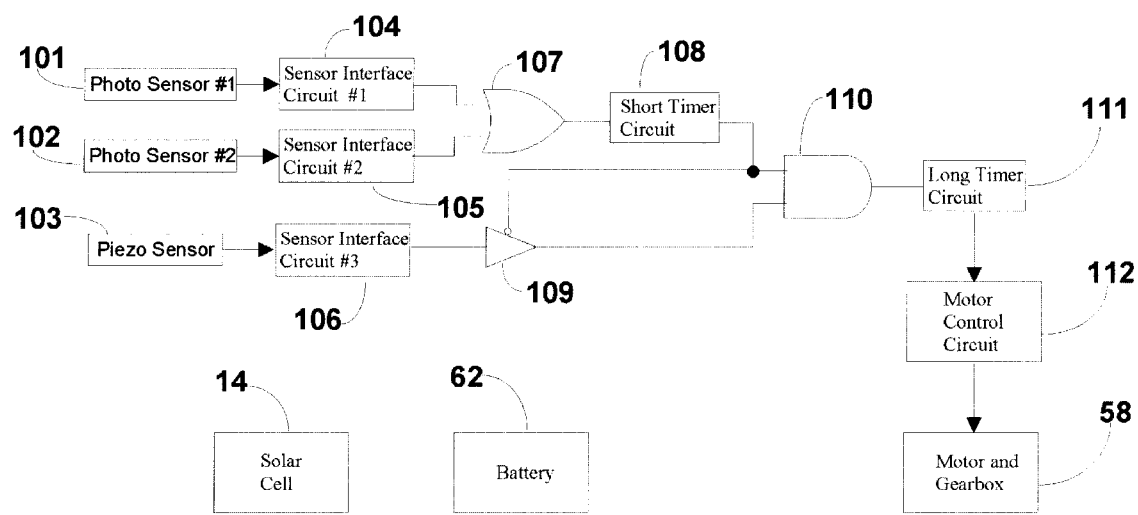
FIG. 10 is a block diagram of an electronic circuit according to the sixth embodiment of the invention.

Refer to FIG. 10 where the sixth embodiment of the invention is presented. A "smart" version of the multi-sensor fusion circuit shown in FIG. 7 will now be discussed. With a few simple modifications and additions, FIG. 7 could be used to discriminate against false alarms. This is accomplished by using both ambient light and mechanical vibrations (and/or sounds) to decide whether the source of energy is from a bird, a different animal, or external noise (wind, rain, etc.). The circuit that ultimately implements the block diagram design shown in FIG. 10 could be used as a separate device that rotates bird feeders/houses or as part the whole enclosure.

An ambient light sensor 101 and an ambient light sensor 102 shown in FIG. 10 can be one or more photoresistors or photodiodes. Another sensor 103 could be the previously described piezoelectric sensor or some kind of acoustic sensor (e.g., a microphone).

A sensor interface circuit #1 104, a sensor interface circuit #2 105, and a sensor interface circuit #3 106, can be similar to the interface circuits previously described. Other circuits using opamps (741's, etc.) could be used instead. In addition, certain filters (LPF, HPF, BPF, etc.) that eliminate unwanted signals could be implemented in these circuits.

A logical OR-gate 107 is required for photo sensor 101 and photo sensor 102 since a bird may fly-in from either side of the bird feeder/house. Thus one or the other photo sensor may be illuminated but not both at the same time.

Logical OR-gate 107 could be an actual TTL 7432 chip if sensor interface circuit #1 104 and sensor interface circuit #2 105 output TTL-level signals. However, low-power chips like CMOS should be used since the circuit in FIG. 10 is powered by rechargeable batteries 62 and solar cells 14. Otherwise, a simple logical OR-gate-type circuit could be implemented using transistors and/or opamps.

A short-timer circuits 108 is required to allow for electronic circuit delays. Also extra time is required for a buffer 109 to processing its inputs and output an signal to a logical AND-gate 110. Short-timer circuit 108 accomplishes this by extending the duration of its input (i.e., pulse-width stretcher) that allows enough time for the rest of the circuit to process their input signals.

The duration of short-timer circuit 108 should be adjusted for at least 5 seconds. This will permit enough time for the birds to land on the bird feeder/house which would activate the other sensor 103.

Short-timer circuit 108 can be a non-retriggerable one-shot using transistors like the one previously described in FIGS. 3, 7, and 9. Or timer chips like the 555 or the LM3909 could also be utilized.

The design in FIG. 10 takes advantage of the fact that birds must fly, or hop (e.g. from a tree, metal pole, etc.), into the bird feeder/house. As a result, photo sensor #1 101 or photo sensor #2 102 should be activated prior to piezo sensor 103. This information is used as the first discrimination step which the next paragraph will describe.

The enable pulse from the output of short timer circuit 108 to buffer 109 insures that logical AND-gate 110 will not respond to outputs from sensor interface circuit #3 106 unless short timer circuit 108 is already activated.

As long as the inputs satisfy CMOS-level specifications, buffer 109 could be a CD4011 chip where one input is used as the enable input. Otherwise, transistors and/or opamps could be configured as a simple enable-buffer circuit.

Logical AND-gate 110 accomplishes the second discrimination step. The output of logical AND-gate 110 will not be activated if both inputs are not received. Conversely, logical AND-gate's 110 output will not go HIGH until a bird has entered the bird feeder/house.

The electronics for logical AND-gate 110 could be an actual TTL 7408 chip if its input signals are TTL compatible. Otherwise a simple logical AND-gate-type circuit could be implemented using transistors and/or opamps.

A long-timer circuit 111 is required in order to rotate the bird feeder/house for an extended period of time (between 1 and 3 minutes). This circuit can be identical to the previously described short timer circuit 108 but with a longer time constant.

The output of long-timer circuit 111 activates a motor control circuit 112 which controls the activation of and RPM speed of motor and gearbox 58. Motor and gearbox 58 is the previously described DC motor with a speed-reduction gearbox attached to its shaft. Motor control circuit 112 can be a transistor configured as an emitter-follower with a variable resistor, tied high, connector to its collector. Or an SCR could be used instead of the transistor.

Figure 11:
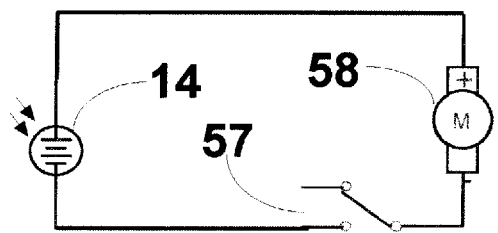
FIGS. 11 to 13 are simplified schematic diagrams according to the seventh, eighth, and ninth embodiments respectively of the invention.
Figure 12:
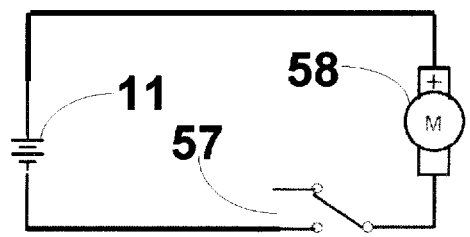
Figure 13:
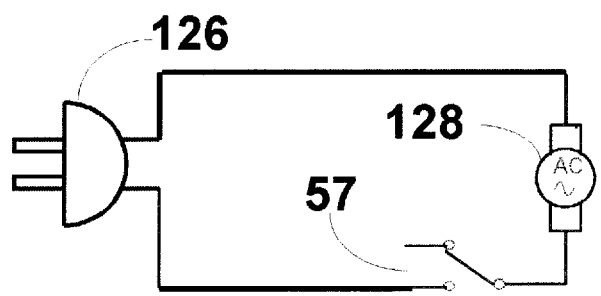

Refer to FIGS. 11, 12, and 13 where the seventh, eighth, and ninth embodiments of the invention are presented. These simplified circuits can be used to replace previously described circuits. For example, the circuit in FIG. 11 can be used to replace the circuit in FIG. 3. Motor/gearbox 58 will be activated when an SPDT switch 57 is closed and there is sufficient ambient sunlight for solar cells 14. In addition, FIG. 12 could also be used to replace the circuit in FIG. 3. When switch 57 is closed, current from alkaline batteries 11 will flow to activate motor/gearbox 58. Lastly, FIG. 13 could also be used to replace the circuit in FIG. 3. Assume an AC plug 126 is connected to a proper alternating current receptacle. Current from plug 126 will then activate an AC motor/gearbox 128 at the moment switch 57 is closed.

SUMMARY, RAMIFICATIONS, AND SCOPE

It is among the principle objects of the present invention to provide a relatively simple device by which a birdfeeder or birdhouse may be rotated. This invention is shown as two basic versions: (1) An external device the rotates suspended birdfeeders, or birdhouses and (2) An internal device packaged as part of the whole enclosure which rotates the whole enclosure. Both versions of this device are described.

Batteries, and/or solar cells, or an alternating current source, with the proper direct current conversion, can be used to power the present invention. To conserve power, an electronic circuit is used to sense the bird's proximity and trigger a timer circuit that turns on a motor for a predetermined period of time. Photodiodes and/or piezoelectric sensors can be used to sense the presence of a bird or squirrel. The motor's angular shaft velocity is reduced through the use of an gearbox or some other mechanism. This is crucial because the avian enclosures cannot be rotated so fast as to harm the birds or so slow as to be almost boring to watch.

It will also be shown that a simplified version of the present invention will be specified that does not require the use of an electronic circuit. This is in view of the fact that the only components really necessary to accomplish the basic objective of the invention is: a power source, a motor/gearbox, and arrangements for supporting the invention and/or avian enclosures. This simplified version of the invention is powered directly by the power source whether it be solar cells, batteries, or an alternating current source outlet. In addition, the simplified alternating current source version has the additional advantage of no requirement for conversion to direct current since alternating current driven motors are readily available.

Although the description above contains many specifications, these should not be construed as limiting the scope of the invention but merely providing illustrations of some of the presently preferred embodiments of this invention. There are several versions of the previously discussed circuits and mechanical parts and configurations that were not disclosed. For example, a completely solar-powered circuit with no batteries could have been shown for FIGS. 3 and 7. Rechargeable batteries could have been replaced by super capacitors. A multiple hook that hangs more than one avian enclosure at the same time could be used in place of the single metal ring shown in FIGS. 1, 2, and 6 or the metal hook of FIG. 8. The gearbox could be replaced by a simple string attached with one end attached the electric motor's shaft. The other end would be, depending on which version of the invention, attached to either the suspended enclosure or a tree limb. Hence the motor would simply wind the string up (i.e., store energy) which would, in turn, start to slowly rotate the suspended bird feeder/house. However, it shall be assumed that all other versions become obvious to anyone skilled in the art and who understands the embodiments of this document. Thus, the scope of the invention should be determined by the appended claims and their legal equivalents, rather than by the examples given.

I claim:

1. An electrical powered apparatus which rotates at least one avian enclosure comprising:

(a) a housing;

(b) a motor attached to said housing;

(c) a revolutions per minute reduction means for said motor for the purpose of decreasing the rotational speed of said at least one rotating avian enclosure;

(d) an attachment means for holding said housing in place while rotating said at least one avian enclosure;

(e) a control means to provide an operating function that activates said motor.

2. The invention of claim 1 wherein operating function to be controlled is operating the application of power from a power source to said motor contained within said housing.

3. The invention of claim 2 wherein the source of power includes a solar cell attached to the outside of said housing and properly positioned so as to be exposed to ambient light.

4. The invention of claim 2 wherein the controlling mechanism of power to said motor includes an electronic animal sensing circuit attached to the inside of said housing with the means to activate said motor for a period of time upon sensing the arrival of at least one animal.

5. The invention of claim 4 wherein said solar cell is electrically connected to said electronic circuit.

6. The invention of claim 4 wherein the electronic animal sensing circuit includes at least one piezoelectric sensor.

7. The invention of claim 1 wherein said revolutions per minute reduction means includes an attachment to the motor's shaft and supports said at least one avian enclosure.

8. The invention of claim 1 wherein said housing is of sufficient size to enclose said motor, said electronic circuit, and said revolutions per minute reduction means.

9. The invention of claim 1 wherein said housing to be of sufficiently strong material so as to support any plurality of avian enclosures.

10. The apparatus of claim 1 wherein said housing is sufficiently weatherproof so as to completely protect contents contained within said housing.

11. An electrical powered rotating avian enclosure comprising:

(a) a motor mounted to said avian enclosure;

(b) a mechanical revolutions per minute reduction device attached to shaft of said motor, (c) means for supporting said avian enclosure attached to said revolutions per minute reduction device;

(d) a control means to provide the operating function that activates said motor.

12. The invention of claim 11 wherein operating function to be controlled is the application of power from a power source to said motor contained within said avian enclosure.

13. The invention of claim 12 wherein the source of power includes at least one battery.

14. The invention of claim 12 wherein the controlling mechanism of power to said motor includes an electronic animal sensing circuit attached to the inside of said avian enclosure with a means to activate said motor for a period of time upon sensing the arrival of at least one animal.

15. The invention of claim 14 wherein the electronic animal sensing circuit includes at least one photoelectric sensor.

16. The invention of claim 14 wherein said electronic circuit is mounted to the inside of said avian enclosure.

17. The invention of claim 11 wherein said battery is electrically connected to said electronic circuit and said motor.

18. The invention of claim 11 wherein said avian enclosure is of sufficient size to enclose said motor, said electronic circuit, said batteries, and said revolutions per minute reduction device.

19. The invention of claim 11 wherein said avian enclosure is of sufficiently strong material so as to support itself.

20. The apparatus of claim 11 wherein said avian enclosure is sufficiently weatherproof so as to completely protect contents contained within avian said enclosure.

* * * * *